(12) United States Patent
Talley et al.

(10) Patent No.: US 11,068,370 B2
(45) Date of Patent: *Jul. 20, 2021

(54) SYSTEMS AND METHODS FOR INSTANTIATION OF VIRTUAL MACHINES FROM BACKUPS

(71) Applicant: Nakivo, Inc., Sparks, NV (US)

(72) Inventors: Bruce Talley, Campbell, CA (US); Oleksii Serhiovych Osypov, Kyiv (UA); Nail Ahmad Amin Abdallah, Kharkov (UA); Veniamin Serhiovych Simonov, Kyiv (UA); Serhiy Serdyuk, Kyiv (UA)

(73) Assignee: Nakivo, Inc., Sparks, NV (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/270,878

(22) Filed: Feb. 8, 2019

(65) Prior Publication Data

US 2019/0286530 A1 Sep. 19, 2019

Related U.S. Application Data

(63) Continuation of application No. 14/847,104, filed on Sep. 8, 2015, now Pat. No. 10,204,019.

(60) Provisional application No. 62/047,038, filed on Sep. 7, 2014.

(51) Int. Cl.
*G06F 9/455* (2018.01)
*G06F 11/14* (2006.01)
*G06F 11/22* (2006.01)

(52) U.S. Cl.
CPC ...... *G06F 11/2294* (2013.01); *G06F 11/1464* (2013.01); *G06F 9/45558* (2013.01); *G06F 2009/4557* (2013.01); *G06F 2009/45575* (2013.01); *G06F 2009/45583* (2013.01); *G06F 2201/815* (2013.01)

(58) Field of Classification Search
CPC ............. G06F 11/2294; G06F 11/1464; G06F 2009/4557; G06F 2009/45583; G06F 9/45558; G06F 2009/45575; G06F 2201/815
See application file for complete search history.

(56) References Cited

U.S. PATENT DOCUMENTS

| 8,453,145 | B1 * | 5/2013 | Naik | G06F 9/45537 |
| | | | | 718/1 |
| 9,354,907 | B1 * | 5/2016 | Teli | G06F 9/45533 |
| 2009/0210427 | A1 * | 8/2009 | Eidler | G06F 11/1484 |
| 2010/0070725 | A1 * | 3/2010 | Prahlad | G06F 11/1453 |
| | | | | 711/162 |

(Continued)

*Primary Examiner* — Jorge A Casanova
(74) *Attorney, Agent, or Firm* — Tillman Wright, PLLC; Jeremy C. Doerre; Chad D. Tillman

(57) ABSTRACT

Technologies including computer implemented methods and systems are described herein for providing instantiation of virtual machines from backups. Systems and methods disclosed herein do not require restoring the complete contents of a virtual machine from a backup prior to using the virtual machine. Systems and methods presented herein allow creating and running a virtual machine directly from a virtual machine backup. Virtual machines created and maintained by the virtual machine instantiation system may be, in turn, used for backup consistency testing, disaster recovery testing, or granular item-level restore.

20 Claims, 6 Drawing Sheets

(56) References Cited

U.S. PATENT DOCUMENTS

| | | | | |
|---|---|---|---|---|
| 2011/0087874 A1* | 4/2011 | Timashev | ........... | G06F 11/1446 |
| | | | | 713/100 |
| 2012/0137098 A1* | 5/2012 | Wang | .................... | G06F 3/0647 |
| | | | | 711/165 |
| 2014/0282511 A1* | 9/2014 | Zheng | ................. | G06F 9/45558 |
| | | | | 718/1 |

* cited by examiner

SYSTEMS AND METHODS FOR INSTANTIATION OF VIRTUAL MACHINES FROM BACKUPS

CROSS-REFERENCE TO RELATED APPLICATION

The present application is a U.S. continuation patent application of, and claims priority under 35 U.S.C. § 120 to, U.S. nonprovisional patent application Ser. No. 14/847,104, filed Sep. 8, 2015, which nonprovisional patent application issued as U.S. Pat. No. 10,204,019, which patent application and any patent application publication thereof or patent issuing therefrom, including the '019 patent, are hereby incorporated herein by reference, and which '104 application is a U.S. nonprovisional patent application of, and claims priority under 35 U.S.C. § 119(e) to, U.S. provisional patent application Ser. No. 62/047,038, filed Sep. 7, 2014, which provisional patent application is incorporated by reference herein. A copy of this provisional patent application is attached hereto as an Appendix, which Appendix is hereby incorporated herein by reference.

The present application also incorporates herein by reference the following U.S. patents and patent application publications: U.S. Pat. Nos. 5,713,024; 6,047,294; USPA Pub. No. 2002/0049718; U.S. Pat. Nos. 7,991,748; 7,937,547; and 8,527,470.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to computer implemented methods and systems for providing instantiation of virtual machines from backups.

Many business information technology workloads are virtualized in the present and this is an ongoing trend. Backing up virtualized data and applications is a common practice. There exist many software and hardware solutions for backing up and restoring virtual machines. One key part of a backup solution is the restore system that allows for the retrieval of data from backup in the event of a disaster.

As might be expected, users of a backup solution often want to be sure of the consistency of their backups. Conventionally, such consistency can be confirmed by making a production virtual machine restore, e.g. by creating a new virtual machine and copying the backup to the new virtual machine. However, such a restore typically requires the entire set of virtual machine data from the backup to be copied to the restore location before the consistency of the backup can be verified.

A need exists for improvement in backup verification. This need and other needs are addressed by one or more aspects of the present invention.

SUMMARY OF THE INVENTION

The present invention includes many aspects and features. Moreover, while many aspects and features relate to, and are described in, a particular context, the present invention is not limited to use only in such context, as will become apparent from the following summaries and detailed descriptions of aspects, features, and one or more embodiments of the present invention.

Accordingly, one aspect of the present invention relates to a method for quickly instantiating a virtual machine backup, the method comprising saving backup VM disk data for a first state of a first virtual machine to a first backup repository; exposing, by a data processing engine, the backup VM disk data for the first state of the first virtual machine; mounting, by a VM host server, the backup VM disk data as a mapped VM disk; restoring a second virtual machine to the first state of the first virtual machine using the mapped VM disk; and starting the second virtual machine.

In a feature of this aspect, the method further comprises automated testing of the second virtual machine, after instantiation of the second virtual machine from backup. In accordance with one or more preferred implementations, the automated testing comprises execution of a test program within a virtual machine operating system. In accordance with one or more preferred implementations, the automated testing comprises capturing the display output within the virtual machine operating system. In accordance with one or more preferred implementations, the automated testing comprises connecting the second virtual machine to a test computer network, which may contain other virtual machines. In accordance with one or more preferred implementations, the automated testing is done through the utilization of an agent program executed within an operating system of the second virtual machine. In accordance with one or more preferred implementations, the automated testing is done through connecting to the second virtual machine via VM host server, sending requests to the virtual machine operating system, and receiving responses to the requests. In accordance with one or more preferred implementations, the automated testing is done through connecting to the virtual machine via a computer network, sending requests to the virtual machine operating system, and receiving responses to the requests.

In a feature of this aspect, the method further comprises an automated restore of items from within the operating system of the running second virtual machine, after instantiation of the second virtual machine from backup. In accordance with one or more preferred implementations, the restored items comprise files in the operating system of the second virtual machine. In accordance with one or more preferred implementations, the restored items comprise applications or application-level objects in the operating system of the second virtual machine. In accordance with one or more preferred implementations, the automated restore is done through the utilization of an agent program executed within the operating system of the second virtual machine. In accordance with one or more preferred implementations, the automated restore is done through connecting to the virtual machine via the VM host server, sending requests to the virtual machine operating system, and receiving responses to the requests. In accordance with one or more preferred implementations, the automated restore comprises connecting to the virtual machine via a computer network, sending requests to the virtual machine operating system, and receiving responses to the requests.

Another aspect relates to a method for quickly instantiating a virtual machine backup, the method comprising: saving backup VM disk data for a first state of a first virtual machine to a first backup repository; exposing, by a data processing engine, the backup VM disk data for the first state of the first virtual machine; mounting, by a VM host server, the backup VM disk data as a mapped VM disk; restoring a second virtual machine to the first state of the first virtual machine by loading virtual machine configuration data from the mapped VM disk; and starting the second virtual machine.

Another aspect relates to a method for quickly instantiating a virtual machine backup, the method comprising: saving backup VM disk data for a first state of a first virtual machine to a first backup repository; exposing, by a data processing engine, the backup VM disk data for the first state of the first virtual machine; mounting, by a VM host server, the backup VM disk data as a mapped VM disk within a production datastore; restoring a second virtual machine to the first state of the first virtual machine by loading virtual machine configuration data from the mapped VM disk into the production datastore; and starting the second virtual machine.

Another aspect relates to a system for instantiation of virtual machines from backups, the system comprising: a user interface module; a management module; a data processing engine; a backup repository; a VM host server; and a production datastore.

In a feature of this aspect, the management module is configured to receive requests from the user interface module and respond to the requests.

In a feature of this aspect, the management module is configured to communicate with VM host server, send requests and receive responses to the requests.

In a feature of this aspect, the data processing engine is configured to receive requests from the management module and respond to the requests.

In a feature of this aspect, the data processing engine is configured to communicate with VM host server, send requests and receive responses to the requests.

In a feature of this aspect, the data processing engine is configured to receive requests from the VM host server and respond to the requests.

In a feature of this aspect, the management module and the data processing engine run on the same computer.

In a feature of this aspect, the management module and the data processing engine run on different computers.

In a feature of this aspect, the backup repository resides on the same computer as the data processing engine.

In a feature of this aspect, the backup repository resides in a remote location relative to the data processing engine.

Another aspect relates to a method for instantiation of virtual machines from backups, the method comprising: exposing virtual machine disk from backup; mounting virtual machine disk on the VM host server; restoring virtual machine configuration using the mounted disk; starting the virtual machine; receiving requests for virtual machine contents from the VM host server; and providing virtual machine contents to the VM host server in response to the requests.

In a feature of this aspect, the virtual machine has a single disk.

In a feature of this aspect, the virtual machine has multiple disks.

In a feature of this aspect, the virtual machine disk is exposed from deduplicated backup.

In a feature of this aspect, the virtual machine disk is exposed from encrypted backup.

In a feature of this aspect, multiple virtual machines are instantiated at the same time.

In a feature of this aspect, wherein the original virtual machine configuration is restored.

In a feature of this aspect, customization is done to the virtual machine configuration during the virtual machine configuration restore.

In a feature of this aspect, the method further comprises automated testing of the running virtual machine, after instantiation of this virtual machine from backup.

In accordance with one or more preferred implementations, the automated testing comprises execution of a test program within the virtual machine operating system.

In accordance with one or more preferred implementations, the automated testing comprises capturing the display output within the virtual machine operating system.

In accordance with one or more preferred implementations, the automated testing comprises connecting the virtual machine to a test computer network, which may contain other virtual machines.

In accordance with one or more preferred implementations, the automated testing is done through the utilization of an agent program executed within the operating system of the virtual machine.

In accordance with one or more preferred implementations, the automated testing is done through connecting to the virtual machine by means of VM host server, sending requests to the virtual machine operating system, and receiving responses to the requests.

In accordance with one or more preferred implementations, the automated testing is done through connecting to the virtual machine by means of computer network, sending requests to the virtual machine operating system, and receiving responses to the requests.

In a feature, the method further comprises an automated restore of items from within the operating system of the running virtual machine, after instantiation of this virtual machine from backup.

In accordance with one or more preferred implementations, the restored items comprise files in the operating system of the virtual machine.

In accordance with one or more preferred implementations, the restored items comprise applications or application-level objects in the operating system of the virtual machine.

In accordance with one or more preferred implementations, the automated restore is done through the utilization of an agent program executed within the operating system of the virtual machine.

In accordance with one or more preferred implementations, the automated restore is done through connecting to the virtual machine by means of VM host server, sending requests to the virtual machine operating system, and receiving responses to the requests.

In accordance with one or more preferred implementations, the automated restore comprises connecting to the virtual machine by means of computer network, sending requests to the virtual machine operating system, and receiving responses to the requests.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
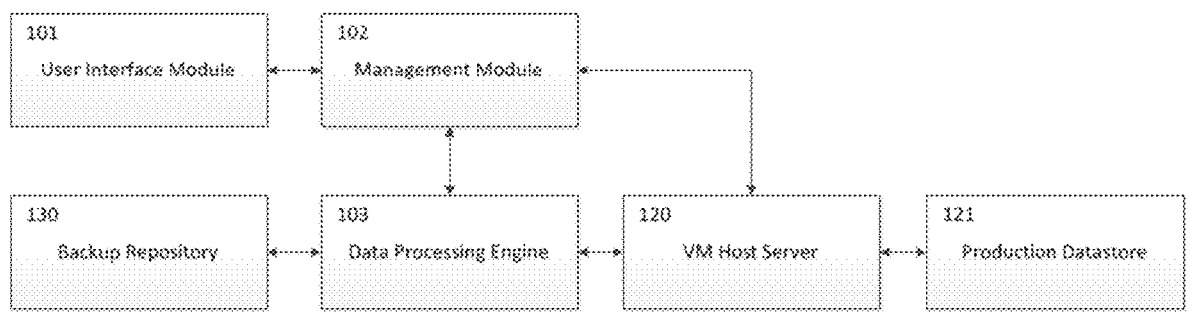
FIGS. 1-3 are software architecture diagrams illustrating aspects of a software architecture utilized in several of the embodiments presented herein.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein as understood by the Ordinary Artisan based on the contextual use of such term differs in any way from any particular dictionary definition of such term, it is intended that the meaning of the term as understood by the Ordinary Artisan should prevail.

In this regard, several terms which may be used herein will now be discussed.

The terms "backup" and "back up" may be used herein as verbs to refer to a process of copying and archiving of original data so that a backup (noun) is created and maintained, which can be, in turn, used to restore the original data in the event of data loss. The term "backup" may be used herein as a noun to refer to a copy of the original data, such as a mirror copy, an image level copy, a file level copy, a file system level copy, an application level copy, a database level copy, a block level copy, or a byte level copy of the original data, which is purposed to keep the data and restore it in case of loss of the original data at an original location. The backup may be stored using storage consumption reduction techniques, including, but not limited to, data compression and de-duplication.

The terms "recovery point" and "restore point" may be used herein to refer to a state of a backup copy, which represents the state of original data at a certain point in time. The recovery point can be used to restore the original data as of this state. A single backup may have one or many recovery points.

The term "user interface module" may be used herein to refer to a component or components of a system described herein which is intended to receive and transfer user requests, respond to the requests, and provide users with access to the system.

The term "management module" may be used herein to refer to a component of a system described herein which is intended to provide backup and restore management, as well as business logic for the system described herein. Such a management module may be run by one or more computer processors.

The term "data processing engine" may be used herein to refer to a component of a system described herein which is intended to receive requests, respond to the requests, read, transfer and write data, process data, and maintain backup storage. Such a data processing engine may be run by one or more computer processors.

The term "virtual machine instantiation" may be used herein to refer to a process of creating a functional instance of a virtual machine from a backup without fully restoring the contents of the virtual machine to a restore location, by means of a system described herein which operates in conjunction with a VM host server (hypervisor).

The terms "backup storage" and "backup repository" may be used herein to refer to a data storage device or medium, such as magnetic devices or medium, semiconductor devices or medium, optical devices or medium, and the like, used to store backups. This can be exemplified by hard disk, magnetic tape, optical disk, solid state drive, and the like. The term may also be used to refer to a storage medium or capacity, which resides in a private or public cloud and is utilized to store backups.

The term "computer" may be used herein to refer to a machine, apparatus, or device that is capable of accepting and performing logic operations from software code.

The term "virtual machine", or "VM", may be used herein to refer to emulation of a computer which is capable of performing logical operations.

The terms "VM host server" and "hypervisor" may be used herein to refer to a software, hardware, computer, or computer system which is capable of creating and running virtual machines.

The terms "production datastore" and "datastore" may be used herein to refer to a data storage device or medium, such as magnetic devices or medium, semiconductor devices or medium, optical devices or medium, and the like, used by a VM host server to store virtual machine data.

The terms "software", "software code", "computer software", "computer application", and "application" may be used herein to refer to any set of instructions operable to cause a computer to perform an operation. Software code may be operated on by a "rules engine" or processor. Methods and systems in accordance with one or more preferred implementations may be performed by a computer based on instructions received by computer software.

The terms "network", "data network", and "computer network" may be used herein to refer to infrastructure capable of connecting two or more computers either using wires or wirelessly allowing them to transmit and receive data. Non-limiting examples of computer networks may include local area networks, wide area networks, intranet, internet, wired networks, and wireless networks, which may include Wi-Fi and cellular networks.

Regarding applicability of 35 U.S.C. 112, paragraph 6 or subsection (f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

The following description of one or more preferred embodiments is merely exemplary in nature and is in no way intended to limit the invention, its implementations, or uses.

As noted above, users of a backup solution for virtual machines or applications often want to be sure of the consistency of their backups, but conventional methodologies for verifying a virtual machine backup typically require copying an entire set of virtual machine data from the backup to a restore location.

In accordance with one or more preferred implementations, verification of a backup is performed by instead exposing a virtual machine disk from a backup location, mounting the exposed virtual machine disk on a virtual machine host server, and restoring a virtual machine configuration using the mounted virtual machine disk without having to copy over all of the data from the backup location to a restore location.

One or more preferred implementations relate to creating and running one or multiple virtual machines directly from backup without the need to restore the entire data set prior to usage of such virtual machines. One or more preferred implementations relate to applied aspects such as testing of instantiated virtual machines, and recovery of virtual machine OS level items from such virtual machines.

One or more preferred implementations provide functionality of a quick test virtual machine restore which brings virtualized data and applications to life as fast as possible.

In accordance with one or more preferred implementations, a quick test virtual machine restore is utilized for granular recovery of virtual machine OS level items, including, but not limited to files, applications, databases, application level objects. Such recovery can be achieved without doing a full production restore of the entire virtual machine or multiple virtual machines.

In accordance with one or more preferred implementations, a test virtual machine restore facilitates a functional restored system in a minimal restore time, the functional restored system being designed for short-term test usage rather than for production usage. Notably, minimal restore time cannot be achieved by using traditional data restore techniques, wherein an entire set of virtual machine data must be copied to a restore location prior to using a restored virtual machine.

In accordance with one or more implementations for providing minimal restore time, a system provides an ability to seamlessly restore a virtual machine from backup in a test restore mode with minimal restore time possible. The functionality provided by such system may be referred to herein as "virtual machine instantiation", as it utilizes non-traditional restore techniques and allows a near-to-instant recovery time objective when restoring a virtual machine.

It is often desirable to verify integrity of virtual machines that are instantiated from backups, as well as verify contents of such virtual machines. In accordance with one or more preferred implementations, automated verification may be performed by means of a virtual machine OS agent program, a VM host program, or computer network requests. Moreover, instantiation of virtual machines may be used to further enable automated and manual restore of virtual machine OS level items (such as files or application objects) from virtual machine backups through the utilization of virtual machine instantiation.

In accordance with one or more preferred implementations, a virtual machine is restored without the contents of the virtual machine; instead, the contents of the virtual machine are exposed by a data processing engine and attached to the virtual machine. Such virtual machine is not designed for production usage and may be used for disaster recovery testing of the virtual machine backup, or for operational recovery of virtual machine OS level items from within a virtual machine.

While subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types.

Moreover, those skilled in the art will appreciate that the subject matter described herein may be practiced with other computer system configurations, including hand-held devices, multiprocessor systems, microprocessor-based or programmable consumer electronics, minicomputers, mainframe computers, computer clusters, computing clouds and the like.

In the following description, references are made to the accompanying drawings that form a part hereof, and which are shown by way of illustration specific embodiments or examples. Referring now to the drawings, in which like numerals represent like elements through the several figures, aspects of a system and methodology for synchronization of backup copies will be described.

As shown in FIG. 1, virtual machine instantiation system comprises a user interface module, a management module, a data processing engine, a backup repository, a VM host server, and a production datastore. User interface module 101 communicates with management module 102, which, in turn, communicates with data processing engine 103 and VM host server 120. Data processing engine 103 communicates with backup repository 130 and VM host server 120. VM host server 120 operates in conjunction with production datastore 121. Through the use of the data processing engine 103, the VM host server is capable of accessing virtual machine contents stored in the backup repository 130.

Figure 2:
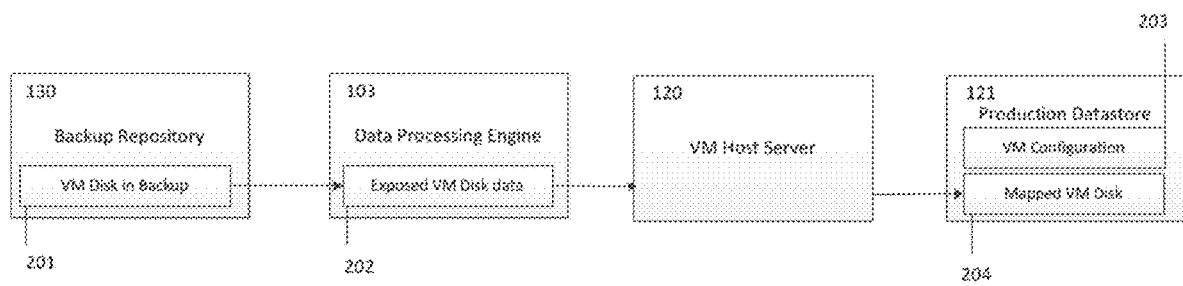

Turning to FIG. 2, more detailed data access is described in the embodiments.

Production datastore 121 contains VM configuration 203 and mapped VM disk 204. By means of the VM host server 120, mapped VM disk is using exposed VM disk data 202, which is presented and maintained by data processing engine 103. Data processing engine 103, in turn, uses VM disk in backup 201, which is stored in the backup repository 130, to present exposed VM disk data 202 to the VM host server 120. Based on this layout, a virtual machine is described, that is run by a VM host server 120 on a production datastore 120, and using contents of the VM disk in backup 201 through the utilization of data processing engine 103. The communication between backup repository 130, data processing engine 103, VM host server 120 and production datastore 121 may occur via computer network or local interfaces.

Figure 3:
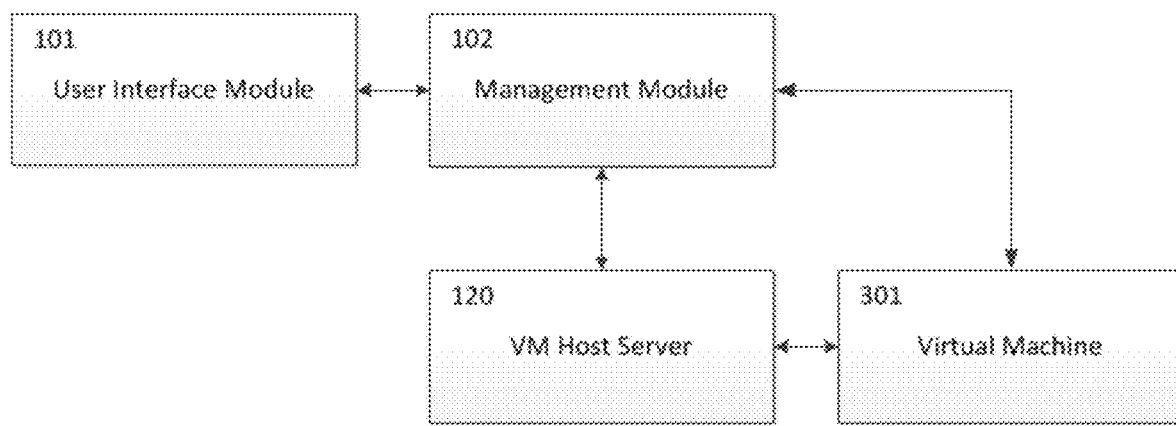

FIG. 3 describes components that provide interaction with the virtual machine which was instantiated from the backup. User interface module 101 sends requests to management module 102, which, in turn, operates in conjunction with VM host server 120 and virtual machine 301. Virtual machine 301 is the virtual machine that was created as a result of virtual machine instantiation process.

Figure 4:
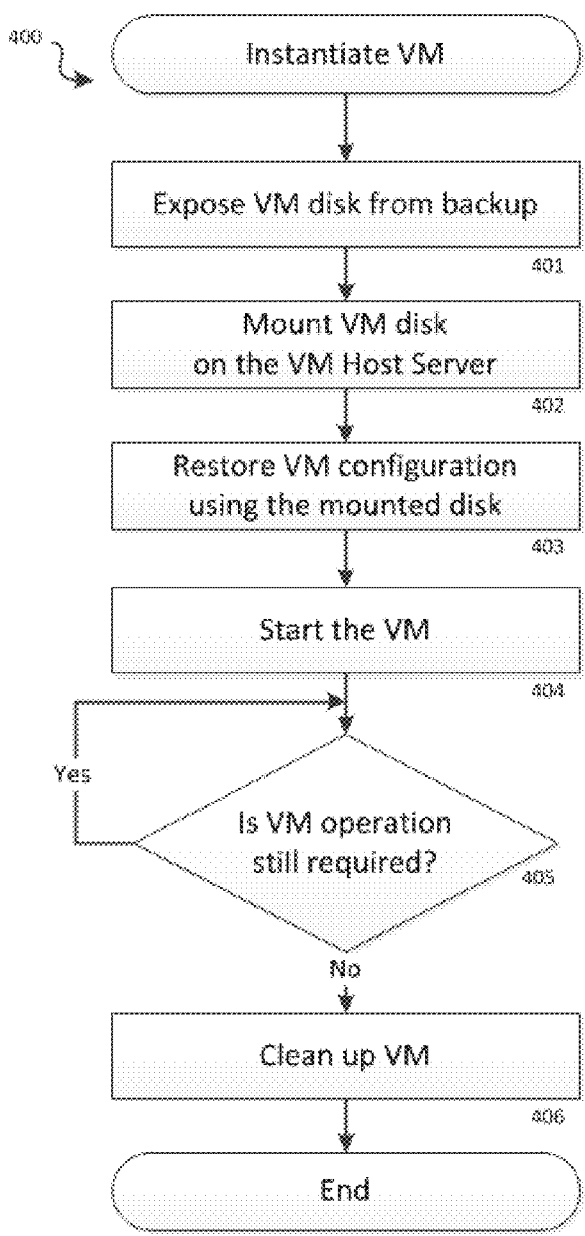
FIG. 4-6 are flow diagram showing illustrative processes for instantiation of virtual machines from backups, testing of such virtual machines, and recovery of virtual machine OS level items according to one or more implementations described herein.

Referring now to FIG. 4, an illustrative routine 400 will be described for instantiation of a virtual machine through the utilization of the system described herein. In this embodiment, the system is requested to instantiate the virtual machine. The routine 400 begins at operation 401, where the VM disk is exposed from the backup by data processing engine. At this point the exposed data is not mounted anywhere. The routine continues to operation 402, where the exposed disk is mounted on the VM host server. The routine continues to operation 403, where the virtual machine configuration is restored using the mounted disk as virtual machine storage. The routine proceeds to operation 404, where the virtual machine is started. The routine then continues to operation 405 which is a loop where a choice is made whether the virtual machine operation is still required or not. If virtual machine operation is still required (i.e. no signal was received from the user to stop and clean up the virtual machine), the routine returns to operation 405. If virtual machine operation is no longer required (i.e. a request was received from the user to remove the virtual machine), the routine moves to operation 406, where the virtual machine is cleaned up. Then the routine ends.

Figure 5:
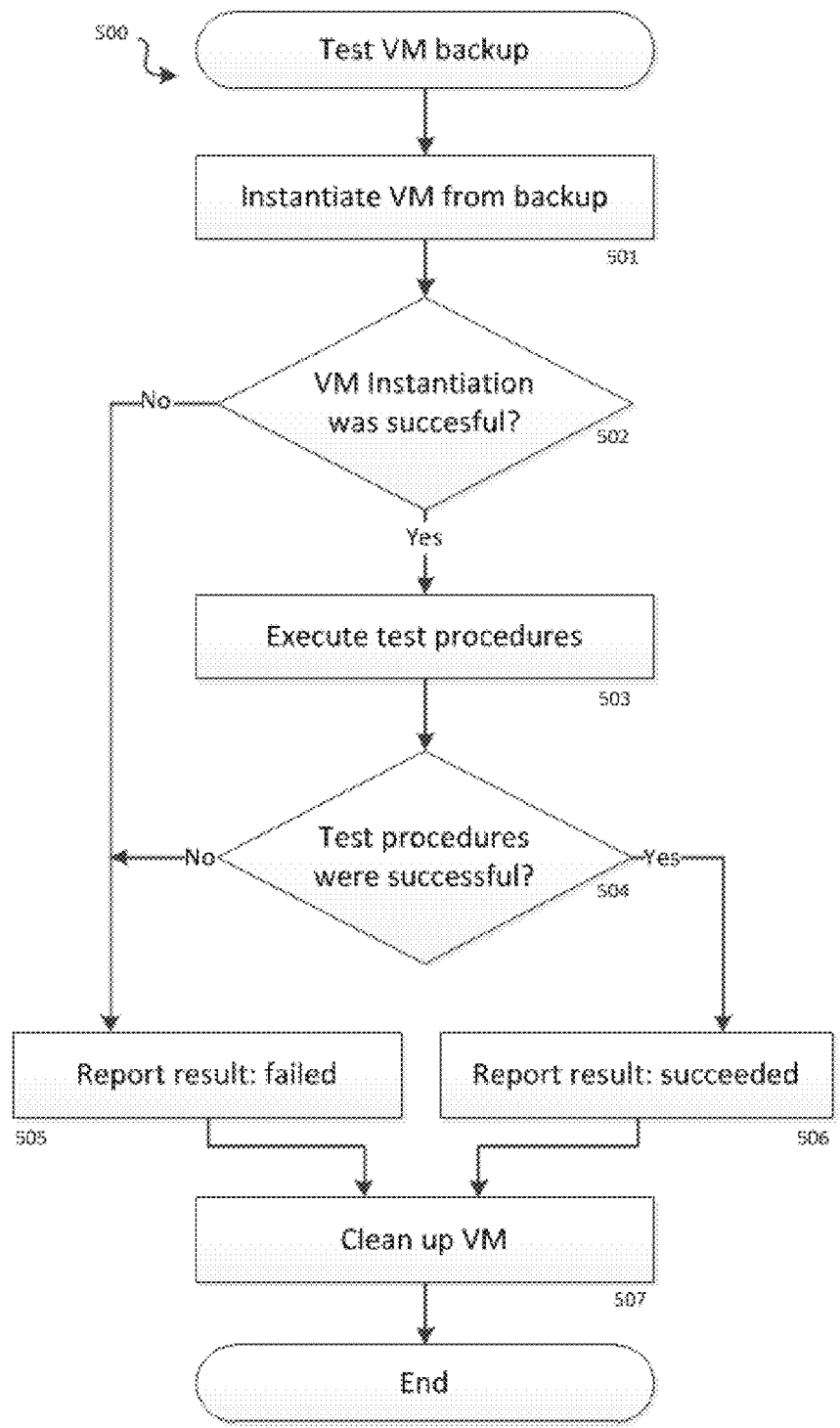

Turning to FIG. 5, an illustrative routine 500 will be described for the process of testing the virtual machine backup through the utilization of instantiation techniques described herein. In this embodiment, the system is requested to test the virtual machine backup. The routine 500 begins at operation 501, where the VM is instantiated from backup. The routine continues to operation 502, where analysis is made whether the VM was successfully instantiated or not. If VM instantiation has failed, the routine switches to operation 505, where the "failed" test result is declared and reported for the virtual machine backup. If VM instantiation is successful, the routine continues to operation 503, where test procedures are executed in the virtual machine. Test procedures may include screen capture, execution of test programs, requests sent to the virtual machine using computer network, and interaction with the virtual machine by means of agent programs. Then the routine continues to operation 504, where a determination is made whether the test procedures were successful or not. If the test procedures were not successful, the routine switches to operation 505. If test procedures were successful, the routine switches to operation 506, where the "succeeded" test result is declared and reported for the virtual machine backup. From operation 505 or 506 the routine continues to operation 507, where the virtual machine is cleaned up. Then the routine ends.

Figure 6:
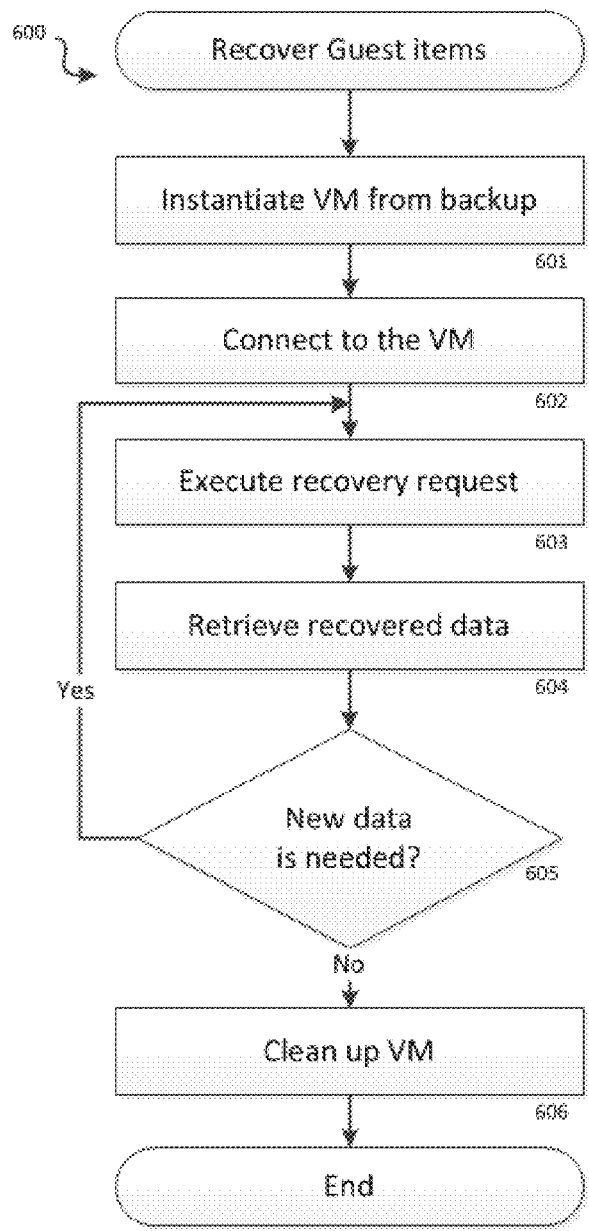

Referring to FIG. 6, a routine 600 will be described that covers the process of recovering virtual machine OS level items from the virtual machine backup through the utilization of virtual machine instantiation from backup. The routine begins at operation 601, where the VM is instantiated from backup. Then it continues to operation 602, where a connection to the VM is established. The connection may be established through utilization of computer network, VM host server, restore program or virtual machine OS agent program. The routine proceeds to operation 603, where the recovery request is executed in the virtual machine.

The recovery request may comprise a request for one or more files, or a request for one or more application-specific objects, such as (not limited to) database records or email messages. The routine proceeds to operation 604, where the recovered data specified in the recovery request is retrieved from the virtual machine. The routine then continues to operation 605, where the determination is done whether the new data is needed for recovery. If any new data is needed, the routine returns to operation 603 where new recovery request is executed. If no new data is needed, the routine proceeds to operation 606, where the virtual machine is cleaned up. Then the routine ends.

Based on the foregoing, it should be appreciated that technologies for instantiation of virtual machines from backups are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention.

Technologies and computer implemented methods and systems are described herein for instantiation of one or more virtual machines from backups. Through the utilization of aspects presented herein, the instantiation system can create and run a virtual machine directly from backup without fully restoring the entire contents of the virtual machine to a restore location. Preferably, the operation and life cycle of such virtual machine is maintained by the instantiation system that operates in conjunction with VM host server. In accordance with one or more preferred implementations, virtual machine instantiation technology provides the ability to skip copying massive amount of data before running the restored virtual machine.

According to aspects presented herein, a virtual machine instantiation system is provided that is designed to create and maintain a virtual machine in conjunction with a virtual machine host server. Virtual machine instantiation system is capable of creating, maintaining and removing virtual machines. Such system may be running on a physical or virtual computer, as well as on multiple computers.

In a preferred embodiment, instantiation of virtual machines is provided through the use of components such as a backup repository, a user interface module, a management module and a data processing engine, which compose a virtual machine instantiation system that operates in conjunction with the VM host server.

In accordance with one or more preferred implementations, once a virtual machine is instantiated, it needs to be maintained in a working state until its operation is no longer required. Preferably, maintenance of virtual machine operation is also handled by the virtual machine instantiation system in conjunction with the VM host server.

Preferably, after the virtual machine operation is no longer needed, it can be gracefully stopped and removed by the virtual machine instantiation system.

In accordance with one or more preferred implementations, the virtual machine instantiation system can be considered as an addition to a hypervisor, which allows creating a virtual machine and running it directly from backup without the need to completely restore all content of the new virtual machine. Such system can also be considered as a part of or as an addition to a virtual machine backup system.

In some embodiments, processes and methods are described for instantiation of virtual machines from backups using the system described herein. In other embodiments, processes and methods are described for testing of such virtual machines and for granular recovery of virtual machine OS level items from such virtual machines.

Subject matter described herein may be implemented as a computer controlled apparatus, a computer process, a computing system, or as an article of manufacture such as a computer-readable medium.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method providing a technical solution to the technical problem of recovering virtual machine (VM) operating system (OS) level items from a virtual machine backup involving quickly instantiating the virtual machine backup, the method comprising:
   (a) creating the virtual machine backup by saving backup VM disk data for a first state of a first virtual machine to a first backup repository;
   (b) receiving a recovery request specifying one or more OS level items to be recovered;
   (c) quickly instantiating a second virtual machine based on the virtual machine backup by
      (i) exposing, by a data processing engine, the backup VM disk data for the first state of the first virtual machine,
      (ii) mounting, by a VM host server, the backup VM disk data as a mapped VM disk,
      (iii) restoring the second virtual machine to the first state of the first virtual machine using the mapped VM disk, and
      (iv) starting the second virtual machine; and
   (d) following instantiation of the second virtual machine based on the virtual machine backup, executing, at the second virtual machine, the recovery request by retrieving the specified one or more OS level items from within the operating system of the running second virtual machine;
   (e) wherein via performance of the method a technical solution is provided which involves recovering virtual machine (VM) operating system (OS) level items from the virtual machine backup that is instantiated with a quicker restore time than would be required for a full production restore that would involve copying over all data for the first virtual machine from a backup location to a restore location.

2. The method of claim 1, wherein the first virtual machine has a single disk.

3. The method of claim 1, wherein the first virtual machine has multiple disks.

4. The method of claim 1, wherein the backup VM disk data is exposed from deduplicated backup.

5. The method of claim 1, wherein the backup VM disk data is exposed from encrypted backup.

6. The method of claim 1, wherein multiple virtual machines are instantiated at the same time.

7. The method of claim 1, wherein the recovery request specifies one or more files to be recovered.

8. The method of claim 1, wherein the recovery request specifies one or more application specific objects to be recovered.

9. The method of claim 1, wherein the recovery request specifies one or more database records to be recovered.

10. The method of claim 1, wherein the recovery request specifies one or more email messages to be recovered.

11. A method providing a technical solution to the technical problem of recovering virtual machine (VM) operating system (OS) level items from a virtual machine backup involving quickly instantiating the virtual machine backup, the method comprising:
    (a) creating the virtual machine backup by saving backup VM disk data for a first state of a first virtual machine to a first backup repository;
    (b) quickly instantiating a second virtual machine based on the virtual machine backup by (i) exposing, by a data processing engine, the backup VM disk data for the first state of the first virtual machine,
(ii) mounting, by a VM host server, the backup VM disk data as a mapped VM disk,
(iii) restoring the second virtual machine to the first state of the first virtual machine using the mapped VM disk, and
(iv) starting the second virtual machine; and
(d) following instantiation of the second virtual machine based on the virtual machine backup, executing, at the second virtual machine, a recovery request by retrieving one or more OS level items specified by the recovery request from within the operating system of the running second virtual machine;
(e) wherein via performance of the method a technical solution is provided which involves recovering virtual machine (VM) operating system (OS) level items from the virtual machine backup that is instantiated with a quicker restore time than would be required for a full production restore that would involve copying over all data for the first virtual machine from a backup location to a restore location.

12. The method of claim 11, wherein the first virtual machine has a single disk.

13. The method of claim 11, wherein the first virtual machine has multiple disks.

14. The method of claim 11, wherein the backup VM disk data is exposed from deduplicated backup.

15. The method of claim 11, wherein the backup VM disk data is exposed from encrypted backup.

16. The method of claim 11, wherein multiple virtual machines are instantiated at the same time.

17. The method of claim 11, wherein the recovery request specifies one or more files to be recovered.

18. The method of claim 11, wherein the recovery request specifies one or more application specific objects to be recovered.

19. The method of claim 11, wherein the recovery request specifies one or more database records to be recovered.

20. The method of claim 11, wherein the recovery request specifies one or more email messages to be recovered.

* * * * *